United States Patent
McCanty et al.

(10) Patent No.: US 11,711,386 B2
(45) Date of Patent: Jul. 25, 2023

(54) MULTI-STATE MESSENGING ANOMALY DETECTION FOR SECURING A BROADCAST NETWORK

(71) Applicant: Battelle Memorial Institute, Columbus, OH (US)

(72) Inventors: Aaron McCanty, Columbus, OH (US); Jason Goodman, Denver, CO (US); Douglas Thornton, Columbus, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 435 days.

(21) Appl. No.: 16/935,401

(22) Filed: Jul. 22, 2020

(65) Prior Publication Data

US 2021/0029147 A1    Jan. 28, 2021

Related U.S. Application Data

(60) Provisional application No. 62/878,432, filed on Jul. 25, 2019.

(51) Int. Cl.
*H04L 29/06* (2006.01)
*H04L 9/40* (2022.01)
*H04L 12/40* (2006.01)

(52) U.S. Cl.
CPC .... *H04L 63/1425* (2013.01); *H04L 12/40032* (2013.01); *H04L 2012/40215* (2013.01); *H04L 2012/40273* (2013.01)

(58) Field of Classification Search
CPC .................. H04L 63/1425; H04L 12/40032
See application file for complete search history.

(56) References Cited

U.S. PATENT DOCUMENTS

| | | | |
|---|---|---|---|
| 9,792,435 | B2 | 10/2017 | Harris et al. |
| 10,083,071 | B2 | 9/2018 | Sonalker et al. |
| 10,298,612 | B2 | 5/2019 | Galula et al. |
| 10,361,934 | B2 | 7/2019 | Elend et al. |

(Continued)

OTHER PUBLICATIONS

International Search Report for International Application No. PCT/US2020/042963 dated Dec. 14, 2020.

(Continued)

*Primary Examiner* — Jeffrey C Pwu
*Assistant Examiner* — Thong P Truong
(74) *Attorney, Agent, or Firm* — Lippes Mathias LLP

(57) ABSTRACT

An electronic device is disclosed, which is connectable with a CAN bus or other broadcast network. The electronic device programmed to compute expected periods and period variability metrics for historical accumulations of messages for different message headers and to identify periodic message headers based on the period variability metrics, and is further programmed to detect a temporal anomaly as a deviation of a period of a most recent set of two or more messages with a periodic message header from the expected period for the periodic message header, and to generate an alert indicating the detected temporal anomaly. The electronic device may be further programmed to maintain a state machine for a vehicle (or other platform) including the CAN bus and perform state-aware anomaly detection.

18 Claims, 8 Drawing Sheets

(56) References Cited

U.S. PATENT DOCUMENTS

2016/0381068 A1* 12/2016 Galula ................. G07C 5/0816
                                                                    726/23
2017/0013005 A1    1/2017 Galula et al.
2020/0035044 A1*  1/2020 Levy ...................... G07C 5/008

OTHER PUBLICATIONS

U.S. Appl. No. 62/878,419, filed Jul. 25, 2019, Colin Wee.
U.S. Appl. No. 14/857,073, filed Sep. 17, 2015, Kevin Mayhew.

* cited by examiner

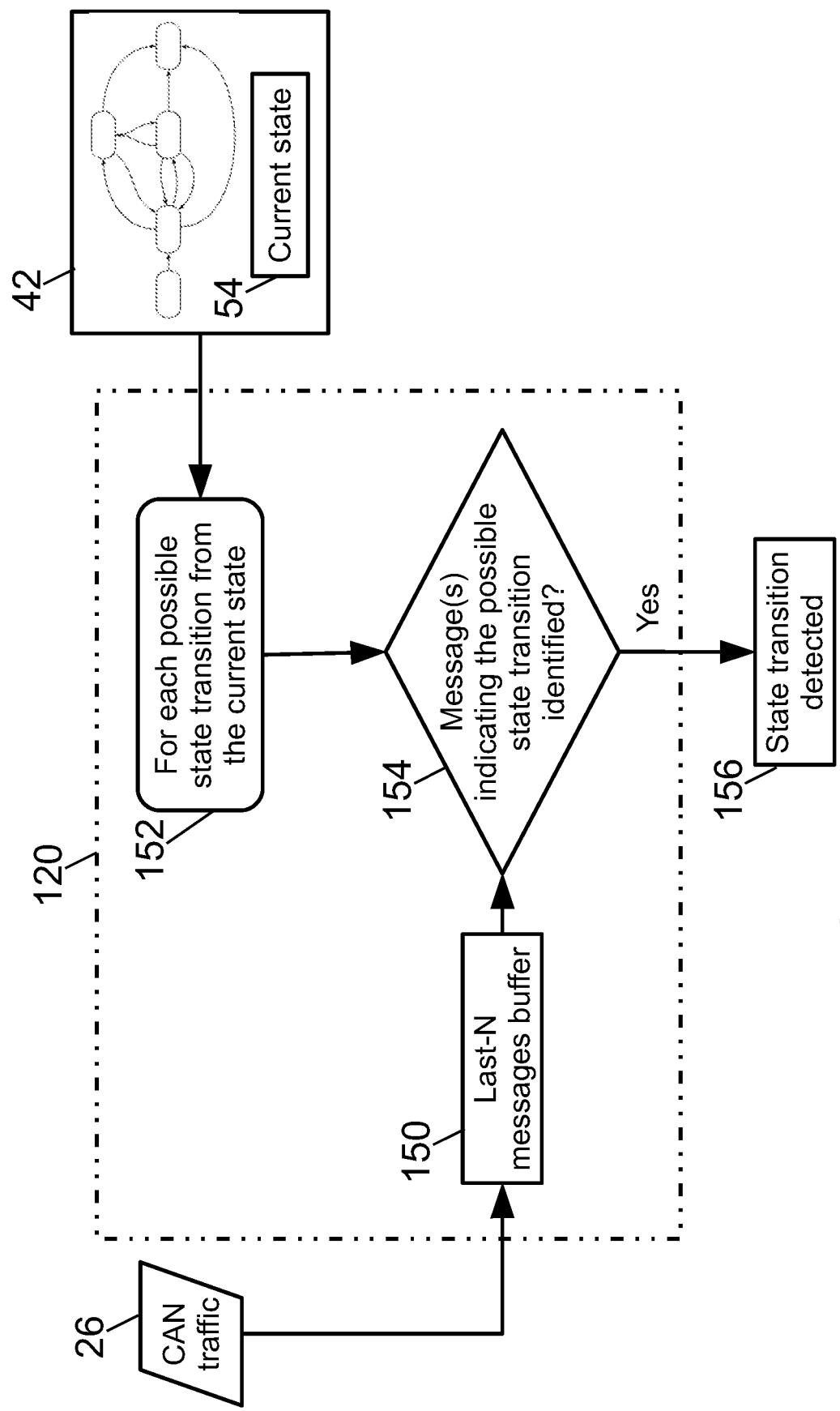

MULTI-STATE MESSAGING ANOMALY DETECTION FOR SECURING A BROADCAST NETWORK

CROSS-REFERENCE TO RELATED APPLICATIONS

This application claims the benefit of U.S. Provisional Patent Application Ser. No. 62/878,432 filed Jul. 25, 2019, and titled "MULTI-STATE MESSAGING ANOMALY DETECTION FOR SECURING A BROADCAST NETWORK", which is incorporated herein by reference in its entirety

BACKGROUND

The following relates to the broadcast network security arts, Controller Area Network (CAN) bus security replacement arts, electronic control unit (ECU) security arts, ground vehicle electronic security arts, water vehicle electronic security arts, space vehicle electronic security arts, ECU trust/assurance arts, industrial control system networks, and the like.

Modern vehicles employ modularized electronic components, such as anti-brake system (ABS) modules, engine control modules, and modules for controlling steering, throttle, cruise control, climate control systems, and various other vehicle functions. These modules intercommunicate by way of a CAN bus. Ancillary systems such as vehicle entertainment systems, navigation systems, or so forth also sometimes include ECUs that are connected into the CAN bus. The above example is a ground vehicle, however water vehicles, space vehicles, e.g., satellites, and industrial control systems all employ such modularization and frequently utilize CAN bus architectures. The CAN bus is a type of broadcast network, that is, a network in which all messages sent on the CAN bus are received by all ECUs on the CAN bus. More generally, a broadcast network is a network in which traffic on the network is received by all electronic devices on the network. In certain embodiments, broadcast networks do not include authentication by which a receiving device can verify the source of the message, or confidentiality, by which a sender can control which receivers can interpret the message. CAN bus traffic does not inherently include message authentication or confidentiality, and adding such capability is often impractical with respect to network data consumption, reliability, and efficiency.

Communications over the CAN bus at the application layer consist of an arbitration identifier (ARB ID) and up to eight data bytes. The ARB ID signifies the meaning of the data contained within the message. For example, wheel speeds could be contained on ARB ID 0x354 with two bytes of data representing the rotational speed for each of the four wheels. Every ECU on the vehicle that has a need to know the wheel speed is programmed to associate ARB ID 0x354 with the wheel speed. Furthermore, the ARB ID provides a convenient way to resolve collisions, that is, situations in which two ECUs attempt to transmit a message on the CAN bus at the same time. In such a situation, the ARB ID of the messages defines the priorities of the messages, the higher priority message is transmitted, and the ECU attempting to transmit the lower priority message automatically re-transmits after a predefined time delay. The broadcast nature of the CAN bus network advantageously enables ad hoc addition of new electronic components. This is ideal for automotive manufacturers that sell vehicles in a range of models with different features, as well as being ideal for after-market manufacturers supplying (for example) after-market sound systems.

However, the broadcast nature of the CAN bus also introduces security challenges. Any ECU (or, more generally, any electronic device on the CAN bus) can be connected with the CAN bus (or an ECU already connected with the CAN bus can be compromised) and can then transmit messages on the CAN bus, and these messages are received by every ECU or other electronic device on the CAN bus network. The messages do not include authentication to identify the sender in a secure manner. Hence, there is no barrier to a device being added to the network that is programmed (or an existing device compromised so as to be programmed) to mimic legitimate transmissions by employing the same ARB ID headers and payload format as are used in the legitimate transmissions, and thereby performing unauthorized and potentially malicious activities via the CAN bus. Such malicious activities could range from unauthorized collection of data to potentially life-threatening actions such as inducing unsafe throttle or braking actions.

Harris et al., U.S. Pat. No. 9,792,435 issued Oct. 17, 2017 and titled "Anomaly Detection for Vehicular Networks for Intrusion and Malfunction Detection" is incorporated herein by reference in its entirety. Sonalker et al., U.S. Pat. No. 10,083,071 issued Sep. 25, 2018 and titled "Temporal Anomaly Detection on Automotive Networks" is incorporated herein by reference in its entirety. These patents describe some approaches for detecting anomalous messaging on a CAN bus, thereby providing alerts of potentially malicious activity on the CAN bus.

Accordingly, there is provided herein certain improvements to the security and responsiveness of the CAN architecture.

BRIEF SUMMARY

In accordance with some illustrative embodiments disclosed herein, an electronic device is disclosed, which is connectable with a network. Traffic on the network is received by all electronic devices on the network, and the network does not provide message authentication. The transmitted messages comprise payloads and message headers identifying the payloads. The electronic device programmed to compute expected periods and period variability metrics for historical accumulations of messages for different message headers and to identify periodic message headers based on the period variability metrics, and is further programmed to detect a temporal anomaly as a deviation of a period of a most recent set of two or more messages with a periodic message header from the expected period for the periodic message header, and to generate an alert indicating the detected temporal anomaly.

In accordance with some illustrative embodiments disclosed herein, an electronic device is disclosed, which is connectable with a network in which traffic on the network is received by all electronic devices on the network and the network does not provide message authentication. The transmitted messages comprise payloads and message headers identifying the payloads. The electronic device includes an electronic processor and a non-transitory storage medium storing temporal anomaly detection instructions which are readable and executable by the electronic processor to perform a temporal anomaly detection method. The temporal anomaly detection instructions include: instructions readable and executable by the electronic processor to compute expected periods and period variability metrics for historical accumulations of messages for different message headers, and to identify periodic message headers based on the period variability metrics; instructions readable and executable by the electronic processor to detect a temporal anomaly as a deviation of a period of a most recent set of two or more messages with a periodic message header from the expected period for the periodic message header; and instructions readable and executable by the electronic processor to generate an alert indicating the detected temporal anomaly.

In accordance with some illustrative embodiments disclosed herein, an electronic device is disclosed, which is connectable with a network in which traffic on the network is received by all electronic devices on the network and the network does not provide message authentication. The electronic device is programmed to: maintain a state machine for the vehicle based on messages on the network and/or sensor data received from one or more sensors monitoring the platform; perform anomaly detection on messages on the network using at least one parameter value for a current state of the state machine including generating an alert in response to detecting an anomaly; and in response to a transition of the state machine from the current state to a new state, updating the at least one parameter value for the new state.

BRIEF DESCRIPTION OF THE DRAWINGS

Any quantitative dimensions shown in the drawing are to be understood as non-limiting illustrative examples. Unless otherwise indicated, the drawings are not to scale; if any aspect of the drawings is indicated as being to scale, the illustrated scale is to be understood as non-limiting illustrative example.

FIGS. 7 and 8 present diagrammatic representations of two illustrative embodiments of the state transition detection block of FIG. 6.

DETAILED DESCRIPTION

Figure 1:
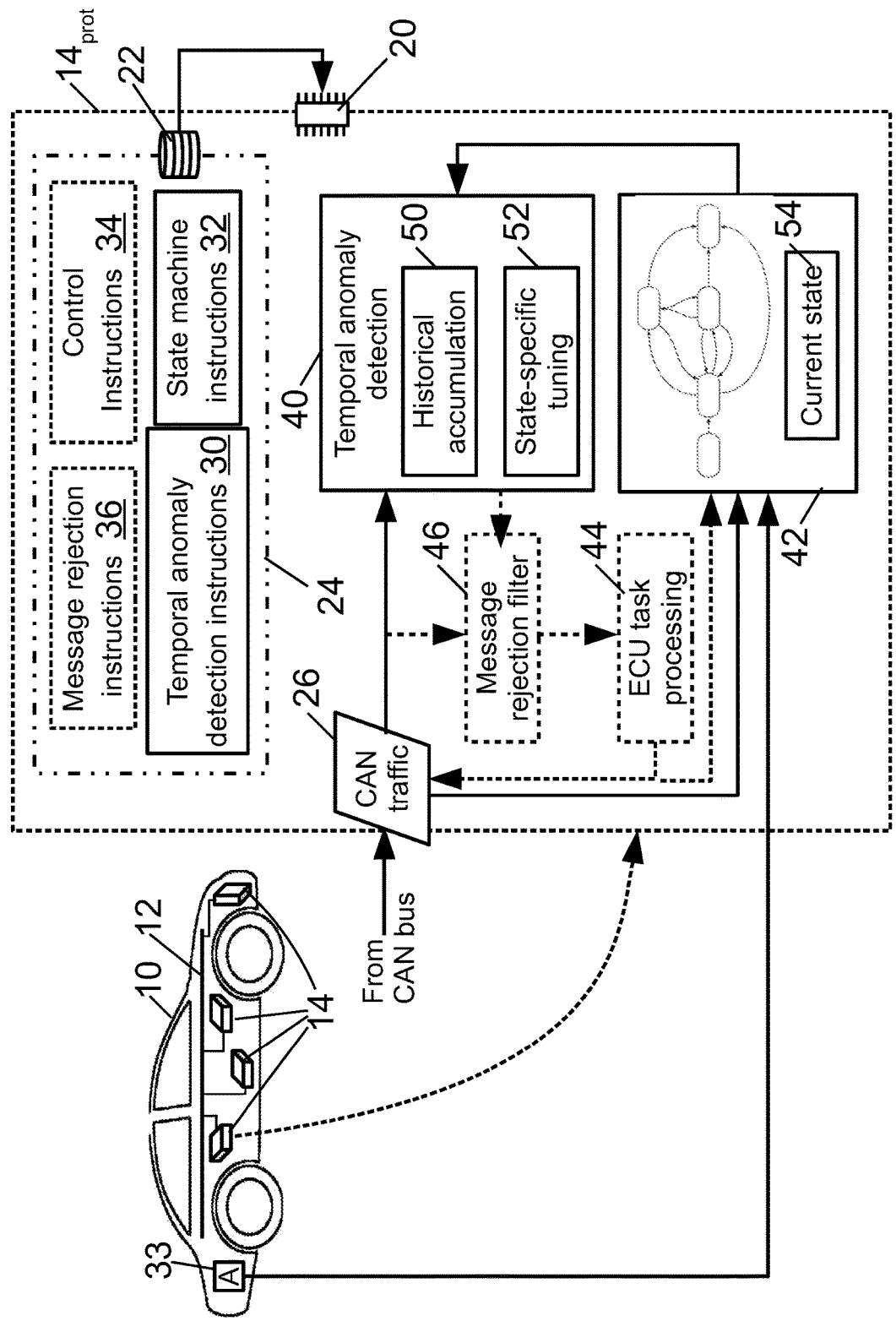
FIG. 1 presents a diagrammatic representation of a vehicle having a CAN bus, and a functional diagram of one ECU on the CAN bus which implements embodiments of temporal anomaly detection as disclosed herein.

As previously noted, the ARB ID of a message on a CAN bus signifies the meaning of the data contained within the message, e.g. wheel speeds could be contained on ARB ID 0x354 with two bytes of data representing the rotational speed of each of the four wheels. Every control module on the vehicle that has need to know the wheel speed is programmed to associate ARB ID 0x354 with the wheel speed. Typically one module, such as the antilock brake system (ABS) module, would be solely responsible for transmitting these messages.

The CAN bus is commonly used on real time systems, and messages can be divided into two types, periodic and aperiodic. Periodic messages are messages of a given ARB ID which are transmitted via real time task schedulers to share information that other modules make use of in their real time control tasks. One example is a torque request emanating from a stability control module requesting a change of torque by the engine control module. A periodic message is transmitted at nearly fixed time intervals. The time intervals are not fully deterministic because CAN itself cannot be guaranteed to be deterministic, e.g. in a collision situation the lower priority message is delayed. When the engine is running with no request for no torque modification, the payload of the successive messages is the same; the payload changes when a torque modification is required, such as to maintain vehicle stability. The second type of messages are aperiodic. These messages are typically transmitted in reaction to a user action, such as a button press or a door unlocking.

Disclosed herein are embodiments of temporal anomaly detection that detects anomalies in the timing of messages in periodic message streams. The disclosed temporal anomaly detection advantageously does not require training on a set of training data, and are adaptive to changes in the average message transmission frequency. Additionally, since the function of temporal anomaly detection does not require access to message data, this function works when the CAN bus messages are encrypted at an application layer.

Disclosed herein are embodiments of state-aware anomaly detection, in which a state machine for the host platform (e.g. a ground vehicle, water vehicle, space vehicle, an industrial automation and process control system, or so forth) is maintained. These embodiments leverage the recognition herein that the pattern of messages of a given ARB ID may depend on the state of the platform. For example, the ABS module may transmit messages broadcasting wheel speed periodically during normal vehicle operation. However, if the cruise control is engaged on the platform (thereby changing the platform state) then the frequency of wheel speed messages transmitted by the ABS module might increase, so as to provide this information to the operating cruise control module at a higher temporal resolution. As another example, the ABS system may transmit messages providing ABS-modulated brake pulse rate when the ABS system is operational during an emergency braking event, but may not transmit these messages otherwise. By recognizing the state of the platform by way of the state machine, messaging anomaly detection can be tuned for the current state of the platform. This state awareness can provide improved accuracy in identifying anomalies. Moreover, the state machine itself can be used for anomaly detection, e.g. if the state machine detects a state transition that is not a permitted state transition of the state machine then this violation can be flagged.

It will be appreciated that the disclosed temporal anomaly detection and the disclosed state-aware anomaly detection can be usefully combined. For example, in the absence of state awareness, an appropriate change in the frequency of messages of a particular ARB ID when the platform state changes (e.g., when the cruise control is engaged) may be incorrectly flagged as an anomaly. In combined embodiments disclosed herein, the state awareness ensures that such an error does not occur. Additionally, in adaptive temporal anomaly detection as disclosed herein, the historical accumulation of messages for a given ARB ID used in adaptively tuning the temporal anomaly detection for that ARB ID can be stored in a memory when the platform changes from a current (first) state to a new state; then, if the platform returns to the first state, the stored historical accumulation of messages for the first state is retrieved and used. (In the absence of such storage/retrieval, when the platform returns to the first state there will be some dead time while a sufficient historical accumulation of messages of the ARB ID is accrued, and any anomalies involving that ARB ID during this dead time will not be detected).

Although the disclosed temporal anomaly detection and the disclosed state-aware anomaly detection can be usefully combined as noted above, it will be further appreciated that the disclosed temporal anomaly detection can additionally or alternatively be used in conjunction with other types of anomaly detection, such as per-message SVM classifier-based anomaly detectors described in Harris et al., U.S. Pat. No. 9,792,435. In this example, different values of the SVM hyperplane curvature parameter $\gamma$ are trained for different states of the vehicle, and value of the parameter $\gamma$ trained for the current state of the platform as indicated by the state machine is used. This enables the SVM classifier to be more precisely tuned for the particular pattern of CAN bus message traffic present in the current state of the platform, as compared with training that is not state-aware.

With reference to FIG. 1, a platform 10 includes a Controller Area Network (CAN) bus 12 to which several Electronic Control Units (ECUs) 14 are connected. The illustrative platform 10 is an automobile. More generally, the vehicle 10 may be a ground vehicle (e.g. an automobile 10 as illustrated, or a truck, off-road vehicle, motorcycle, bus, or the like), a water vehicle (e.g. an ocean-going ship, a submarine, or the like), or a space vehicle (e.g. an orbiting satellite, an interplanetary probe, or the like), or may be an industrial control system, e.g. an industrial automation and/or industrial process control system, which employs a CAN bus or other broadcast network. More generally, the ECUs can be any electronic device that is connected with the CAN bus or other network 12 of the platform (e.g. vehicle, industrial control system, et cetera), such as (in the case of a typical vehicle): engine control modules, ABS modules, power steering modules, and/or other vehicle operation-related electronic devices; car stereos or other in-vehicle entertainment systems; radio transceivers used for off-vehicle communication (e.g., a communications satellite transceiver); vehicle climate control modules; and/or so forth. In the case of an industrial control system, the ECUs may, for example, include furnace control modules, gas flow controller ECUs, robotic controllers, and/or so forth. More generally, the CAN bus 12 can be any broadcast network, that is, any network in which traffic on the network is received by all electronic devices on the network and the traffic on the network does not include message authentication. Message authentication in this context is information contained in the message, or in the architecture of the network, by which the receiving device can verify the source of the message. A CAN bus does not natively provide message authentication. It should be noted that while the network does not provide message authentication, a given set of two or more ECUs 14 on the network may incorporate authentication into the messages sent between those ECUs. For example, two ECUs could employ public key cryptography by exchanging public keys via the CAN bus or by some other communication pathway, and thereafter encrypted messages between these ECUs would be authenticated by way of the public key encryption. However, the network is not providing that message authentication.

Messages on a broadcast network may comprise payloads and message headers that identify the payloads. In the case of a CAN bus, the message headers identifying the payload are ARB ID headers. In this regard, although in a given platform a single ECU may solely transmit messages with a specific ARB ID header, this does not mean that this specific ARB ID header serves as message authentication by which a receiving device can verify the source of the message. This is because any ECU on the network could be compromised to transmit messages with that ARB ID (or, alternatively, a malicious new device could be connected with the CAN bus and transmit messages with that ARB ID), and the receiving device would have no way of knowing that the message came from the compromised device or malicious new device, rather than from the ECU that is supposed to transmit messages with that ARB ID. More generally, the disclosed approaches may be used on any network in which traffic on the network is received by all electronic devices on the network (i.e. a broadcast network) and the traffic on the network does not include message authentication, and in which the transmitted messages comprise payloads and message headers identifying the payloads. The illustrative embodiments employ a CAN bus as the network, and the header is a complete ARB ID, a subset of the ARB ID such as the parameter group number (PGN) as in the SAE J-1939 standard, or some other identifier the consistently represents the same data contents.

With continuing reference to FIG. 1, at least one protection ECU $14_{prot}$ (or, more generally, an electronic device $14_{prot}$ on the network 12) includes anomaly detection capability as diagrammatically represented in FIG. 1. The protection ECU $14_{prot}$ includes an electronic processor 20 and a non-transitory storage medium 22 storing instructions 24 which are readable and executable by the electronic processor 20. The hardware components 20, 22 may be variously implemented. For example, in some embodiments, the electronic processor 20 and the non-transitory storage medium 22 may be separate integrated circuit (IC) chips disposed on a printed circuit board (PCB, not shown) with conductive traces of the PCB operatively connecting the processor 20 and storage medium 22. As some examples, the electronic processor 20 may comprise a microprocessor or microcontroller IC chip and the non-transitory storage medium 22 may comprise a memory IC chip such as a flash memory chip, read-only memory (ROM) IC chip, electronically programmable read-only memory (EPROM) IC chip, or so forth. In other embodiments, the electronic processor 20 and the non-transitory storage medium 22 may be monolithically integrated as a single IC chip. As some examples, the ECU $14_{prot}$ is implemented as an Application-Specific Integrated Circuit (ASIC) chip or Field Programmable Gate Array (FPGA) chip in which both the storage and the digital processor are monolithically fabricated on a single ASIC or FPGA. As already noted, the ECU $14_{prot}$ receives CAN traffic 26 from the CAN bus 12.

With continuing reference to FIG. 1, the instructions 24 include temporal anomaly detection instructions 30 which are readable and executable by the electronic processor 20 to perform a temporal anomaly detection method implementing temporal anomaly detection, and state machine instructions 32 which are readable and executable by the electronic processor 20 to maintain a state machine for the platform 10 based on messages on the CAN bus or other network 12, and/or sensor data received from one or more sensors monitoring the platform 12, such as an inertial sensor. For example, if the ECU $14_{prot}$ is connected to receive sensor data from an accelerometer 33, then acceleration data from the accelerometer 33 could be used to measure platform state (such as rate of acceleration of the illustrative vehicle platform 10, detection of whether the engine is on or off based on engine-induced vehicle vibration, or so forth). Other types of inertial sensors may be used in addition to or instead of the illustrative accelerometer 33 (e.g., gyroscopes, magnetometers). As another illustrative example, in the case of an industrial control system, suitable sensors may include temperature sensors, pressure sensors, gas sensors, and/or other types of industrial process sensors. It should be noted that the sensor(s) monitoring the platform 12 may be physically integrated into the ECU $14_{prot}$, or (as in illustrative FIG. 1) may be connected with the ECU $14_{prot}$ by wiring, cabling, a wireless communication interface, or the like. If the connection is by way of the CAN bus 12, which is another possible approach, then the sensor data will be in the form of messages on the CAN bus network. In some embodiments, the ECU $14_{prot}$ is a dedicated electronic device that only performs anomaly detection. In other embodiments, the ECU $14_{prot}$ is an ECU that performs some other function (for example, the ECU $14_{prot}$ could be an ABS module controlling anti-lock braking, a cruise control module, or so forth). In these latter embodiments, the instructions 24 further include control instructions 34 that are readable and executable by the electronic processor 20 to control the electronic device $14_{prot}$ (for example, to implement the ABS, or to implement the cruise control, or so forth). In embodiments including the control instructions 34, the instructions 24 may optionally further include message rejection instructions 36 which are readable and executable by the electronic processor 20 to prevent the control instructions 34 from processing messages detected as anomalous by the temporal anomaly detection method. The ECU $14_{prot}$ executing the instructions 24 thereby implements temporal anomaly detection 40 (via execution of the temporal anomaly detection instructions 30), maintains a state machine 42 for the vehicle 10 based on messages on the CAN bus or other network 12 and/or sensor data received from one or more sensors 33 monitoring the platform (via execution of the state machine instructions 32); and in some embodiments also performs ECU task processing 44 via execution of the control instructions 34, optionally including a message rejection filter 46 via execution of the message rejection instructions 36.

The ECU task processing 44 is optional, and is included if the ECU $14_{prot}$ performs function(s) on the platform 10 besides providing the disclosed network-protective anomaly detection service. For example, if the platform 10 is a ground vehicle and the ECU $14_{prot}$ is an antilock brake system (ABS) module, then the ECU task processing 44 suitably performs functions relating to anti-lock braking, such as monitoring wheel speeds, monitoring the signal from the brake pedal, and modulating (e.g. pulsing) the brake applied to a wheel if it is detected to be failing to engage the road during a braking event. As another example, if the platform 10 is an industrial control system and the ECU $14_{prot}$ is a furnace control module, then the ECU task processing 44 may include monitoring temperatures of one or more furnace zones and adjusting electrical current to furnace heater coils (for an electrical furnace) or adjusting fuel flow to furnace burners (for a combustible-fuel furnace). On the other hand, it is alternatively contemplated for the ECU $14_{prot}$ to be a dedicated device for providing (only) the disclosed network-protective anomaly detection service, in which case the ECU task processing 44 is omitted.

As will be described further herein, the temporal anomaly detection 40 includes maintaining a historical accumulation 50 of messages of each ARB ID being monitored for anomalies, and optionally includes state-specific tuning 52 in which the anomaly detection is tuned for a current state 54 of the state machine 42. As diagrammatically indicated in FIG. 1, the temporal anomaly detection 40 receives and processes the CAN bus traffic 26, and likewise the state machine 42 for the vehicle 10 is maintained based on messages on the CAN bus traffic 26. The ECU task processing 44 (if performed) also receives the CAN bus traffic 26, except to the extent that anomalous messages detected by the temporal anomaly detection 40 may be rejected by the optional message rejection filter 46. Depending upon the task being performed, the ECU task processing 44 may also transmit messages, that is, the ECU task processing 44 may also inject messages into the CAN bus traffic 26. These outgoing messages are typically not processed by the temporal anomaly detection 40 (although it is alternatively contemplated to also process the outgoing messages by the temporal anomaly detection 40), but may be included in the CAN traffic on which the state machine 42 is maintained. For example, if the ECU $14_{prot}$ is the cruise control module of the vehicle 10 then the ECU task processing 44 may include sending a message indicating the cruise control is engaged, and this may cause a state transition in the state machine 42.

In the illustrative example, a single ECU $14_{prot}$ on the CAN bus 12 performs the state-aware anomaly detection 40, 42. This can be sufficient, since traffic on the network is received by all electronic devices on the network it follows that a single electronic device connected to the CAN bus 12 can monitor all CAN bus traffic. However, it is contemplated to have more than one, or even all, of the ECUs 14 provided with the state-aware anomaly detection 40, 42. For example, any device for which the message rejection filter 46 is desired would advantageously include the state-aware anomaly detection 40, 42.

Furthermore, it is contemplated to implement the temporal anomaly detection 40 without the state machine 42, in which case there would be no state-specific tuning 52 and the historical accumulation 50 would not be state-specific. Conversely, it is contemplated to implement the state machine 42 in conjunction with anomaly detection other than (or in addition to) the illustrative temporal anomaly detection 40. For example, as previously discussed the per-message SVM classifier-based anomaly detector described in Harris et al., U.S. Pat. No. 9,792,435 could benefit from state-awareness.

Figure 2:
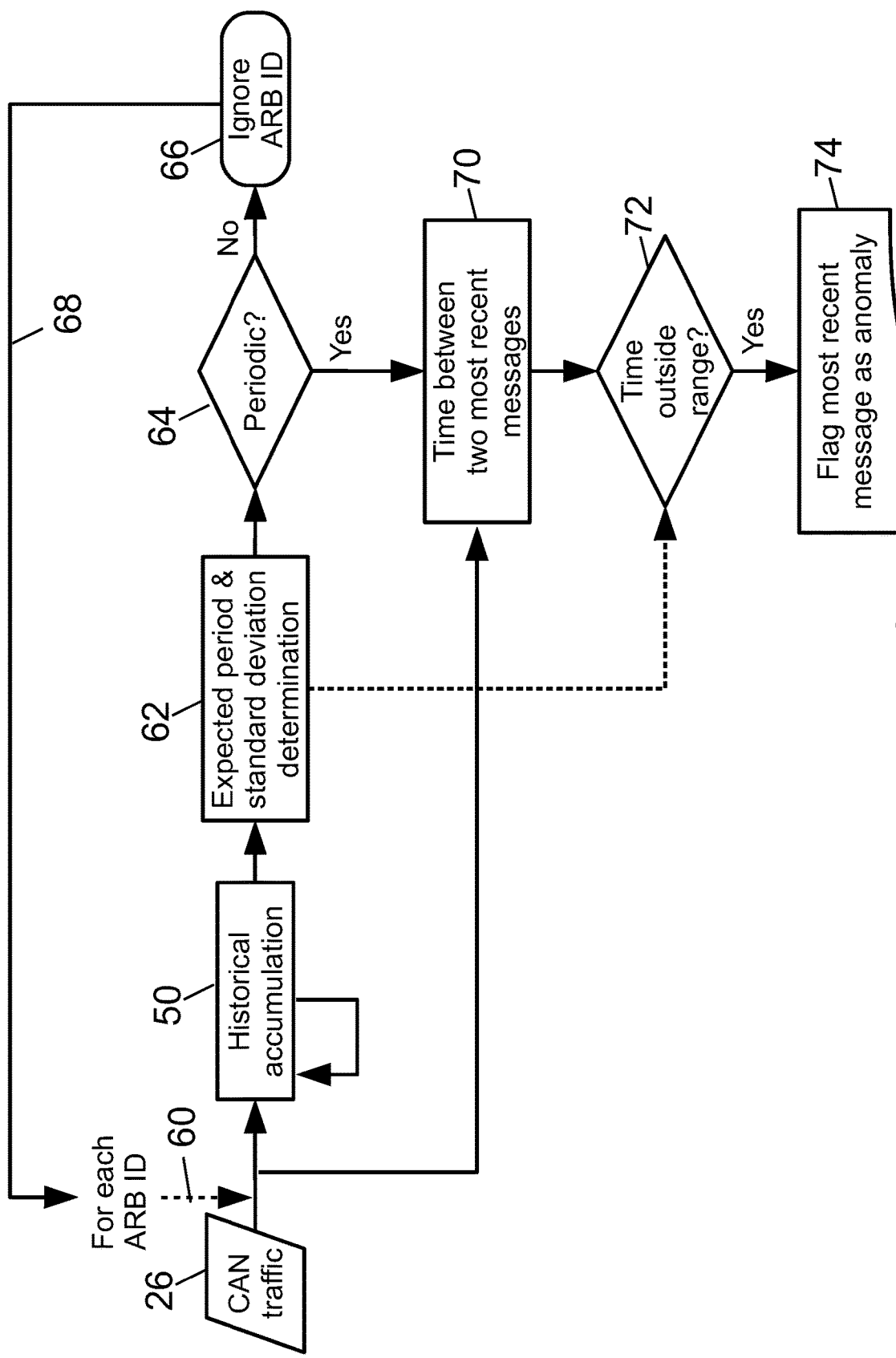
FIGS. 2 and 3 presents diagrammatic representations of two illustrative embodiments of the temporal anomaly detection of FIG. 1.

With reference now to FIG. 2, an illustrative embodiment of the temporal anomaly detection 40 is described. For each message header 60 in the CAN bus traffic 26, historical accumulation 50 is maintained. The message header 60 may, by way of illustration, be a complete ARB ID, or a subset of the complete ARB ID such as the parameter group number (PGN) as in the SAE J-1939 standard, or so forth. Although not explicitly shown in the drawings, it is to be understood that each message is assigned a timestamp indicating when the message was received at the electronic device $14_{prot}$ described in FIG. 1. Hence, the messages recorded in the historical accumulation 50 are timestamped. The clock generating the timestamp can be local to the electronic device, and does not need to be synchronized across the network. Statistics 62 for the historical accumulation including expected period and period variability metrics are computed for the historical accumulation 50 of messages. In one approach, each message with the subject message header is associated with the time at which it was received (i.e., timestamped). This time is compared to the most recent previous time the message was received, resulting in a measure of message period which is added to the historical accumulation 50. Once the historical accumulation 50 includes some designated minimum number of samples (which can be a tunable parameter of the state-specific tuning 52, or a tunable global parameter if there is no state-awareness), statistics 62 including a mean or average message period is determined, along with the standard deviation, variance, or other chosen variability metric. The variability metric is a measure of the determinism of messages the message header. For example, a small standard deviation or variance indicates highly periodic occurrences of the messages of the message header; whereas, a large value for the standard deviation or variance indicates a wide range of different message periods and low periodicity. At a decision 64 it is determined whether the messages of the subject message headers are sufficiently periodic to be deemed deterministic. For example, the decision 64 may employ a threshold on the standard deviation (or, alternatively, variance) whereby if the standard deviation (or variance) is below the threshold then the message header is deemed to be periodic, otherwise the message header is deemed to be nonperiodic. If the message header is non-periodic then at 66 the message header is thereafter ignored. This is diagrammatically indicated in FIG. 2 by feedback arrow 68 indicating that the message header should thereafter not be accumulated or further processed. Noted that there is a separate historical accumulation 50 and separate statistics 62 for each message header that occurs on the CAN bus.

In addition to not computing (or alternatively ignoring) the statistics 62 until the designated minimum number of samples are accumulated, in some embodiments the statistics 62 are reset after a period of inactivity on a given message header. This reset function can also be a tunable parameter of the state-specific tuning 52, or a tunable global parameter if there is no state-awareness. In a non-limiting illustrative example, the reset of the statistics 62 is applied after 30 seconds without any messages with the subject message header. This mechanism allows the statistics 62 to reflect the operation of the platform by ignoring missing messages. Missing messages may be a sign of malfunction or simply a user not exercising a portion of the system (e.g., not using the cruise control), but are not likely to be a symptom of a malicious attack. It should also be noted that it is contemplated to employ other approaches for computing the statistics 62 including expected value and variance metrics, such as applying a Fast Fourier Transform (FFT) to compute the mean and variance or standard deviation.

With continuing reference to FIG. 2, detection of an aperiodic messages sent with a periodic message header (that is, a message with an message header that is periodic as indicated at the decision 64) is done as follows. A period 70 of the most recent two messages with the periodic message header (that is, the subject message header in the case of a CAN bus) is computed as the time separation of the most recent two messages. At a decision 72, an anomaly is detected if a deviation of the time separation 70 of the most recent two messages from the expected period for the periodic message header (from the historical statistics 62) exceeds some threshold X, which again may be a tunable parameter of the state-specific tuning 52, or a tunable global parameter if there is no state-awareness. In some embodiments the threshold X is a specified percentage deviation from the expected period for the message header. If an anomaly is detected, then at an operation 74 the most recent message with the subject message header is flagged as an anomaly. For example, if the message rejection filter 46 of FIG. 1 is employed then the anomaly flagging operation 74 may also trigger the filter 46 to block the most recent message from being processed by the ECU task processing 44. Additionally or alternatively, the anomaly flagging operation 74 may send a warning to an on-board computer display of the vehicle 10, and/or the warning may be wirelessly transmitted to a centralized location (e.g. a monitoring center of the automobile manufacturer, who uses the information to monitor firmware upgrades), and/or so forth.

One potential difficulty with the temporal anomaly detection approach described with reference to FIG. 2 is that the non-deterministic nature of the CAN bus (e.g., the possibility of message transmission delays due to collisions) means that the threshold X may need to be set to a fairly high value to limit false positives, which can reduce sensitivity. This is due to a temporal anomaly being detected as a deviation from the expected period (from statistics 50) for the periodic message header of a period of a most recent set of only two messages with the periodic message header.

Figure 3:
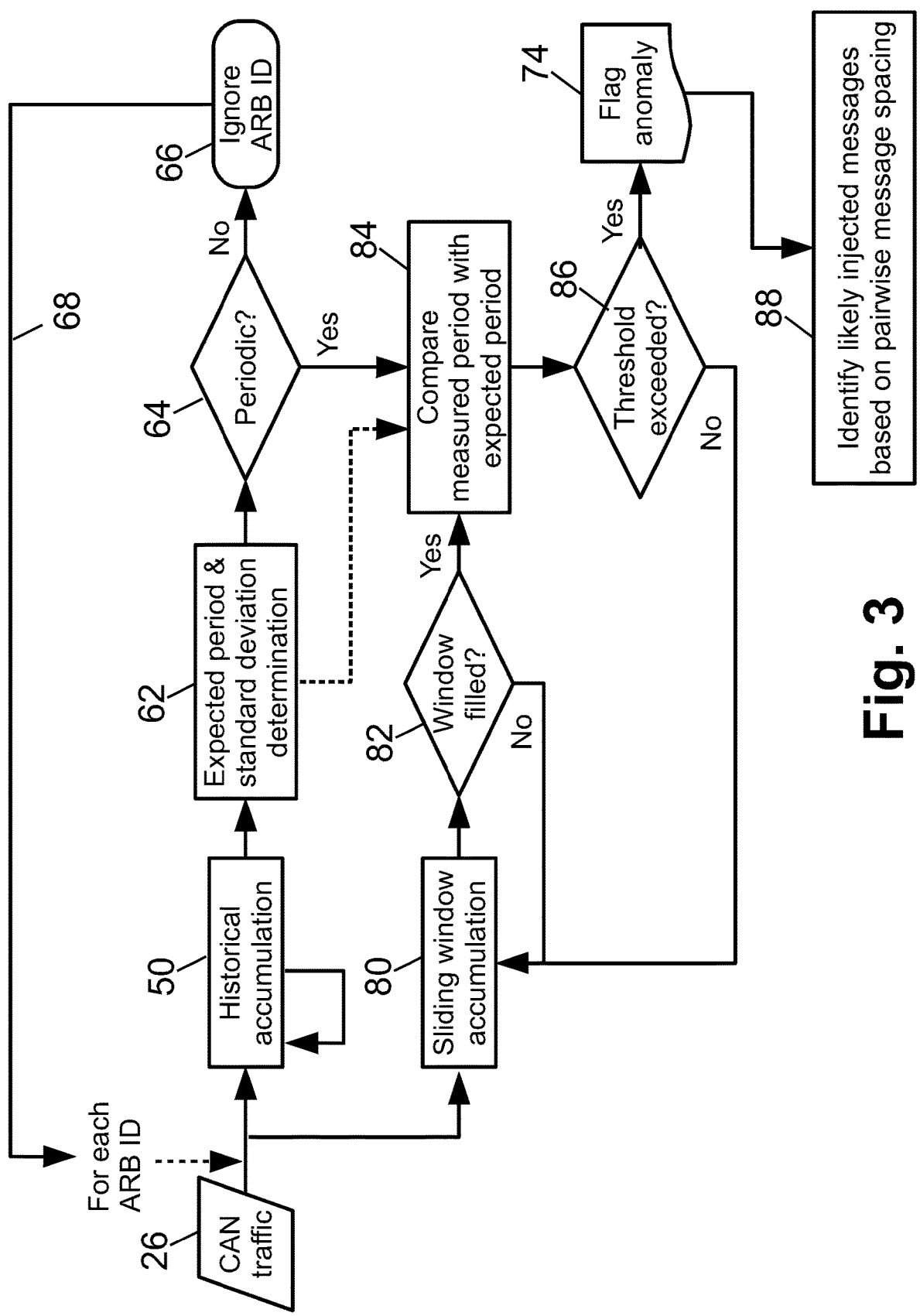

With reference to FIG. 3, another illustrative embodiment of the temporal anomaly detection 40 is described, which uses the statistics of a sliding window 80 along with the historical average 50. By use of the sliding window 80, a temporal anomaly is detected as a deviation from the expected period of a period of a most recent set of more than two messages with the periodic message header. A window size W of the sliding window may be a tunable parameter of the state-specific tuning 52, or a tunable global parameter if there is no state-awareness. As shown in FIG. 3, the processing 62, 64, 66, 68 is suitably performed as already described with reference to FIG. 2 in order to determine that the subject message header is sufficiently periodic to perform temporal anomaly analysis. For each periodic message header as thusly determined, the sliding window accumulation 80 is performed until at a decision 82 the window is detected to be filled with W samples. Once the window is filled, at an operation 84 the period of the most recent set of W messages with the periodic message header is computed. This can be computed, for example, as:

$$T = \left(\frac{1}{W-1}\right)\sum_{i=1}^{W-1}(TS_{i+1} - TS_i) \quad (1)$$

where $TS_i$ is the timestamp of the sample indexed by the index i, and T denotes the computed period of the most recent set of W messages. At a decision 86, an anomaly is detected if a deviation of the period computed at operation 84 from the expected period for the periodic message header (from the historical statistics 62) exceeds some threshold X, which again may be a tunable parameter of the state-specific tuning 52, or a tunable global parameter if there is no state-awareness. In some embodiments the threshold X is a specified percentage deviation from the expected period for the message header. If an anomaly is detected, then at operation 74 the most recent message with the subject message header is flagged as an anomaly, as already described with reference to FIG. 2. It may be noted that the decision 86 identifies that the contents of the sliding window 80 likely contains at least one anomalous message, i.e. at least one message that has been injected into the otherwise periodic stream of messages with the subject message header. This present some uncertainty as to the specific messages that may have been maliciously inserted, as the window 80 contains W samples. Thus, in a further optional operation 88, the likely injected message(s) can be (at least tentatively) identified based on the pairwise message spacings. In other words, at the optional operation 88, the time interval ($TS_i-TS_{i-1}$) for each message i=2, ..., W in the sliding window 80 is computed, and if this time interval deviates from the expected period (from the statistics 62) by more than some threshold then the message indexed by index i is flagged as a likely injected message.

The window size W of the sliding window 80 presents a tradeoff between the likelihood of a false positive attack flag and the time in which it takes to flag an attack. If real time control communications on a vehicle operate at frequencies greater than 20 Hz, then an attack may be detected and alerted within one second or less by using a window size W of 20 samples.

Advantageously, both the temporal anomaly detection approach described with reference to FIG. 2 and the temporal anomaly detection approach described with reference to FIG. 3 do not require performing training of any machine learning (ML) component. Moreover, if the historical accumulation 50 is reset as previously described, then the approach can be adaptive. Improved real time adaptivity can be achieved if the historical accumulation 50 is implemented as a first-in, first-out (FIFO) buffer of sample size BH. For example, if BH is set to 5000 samples and the periodicity of the subject message header is 500 Hz, then slow changes in the expected period over time on an order of ten seconds can be accommodated as the buffer discards the oldest samples.

As another variant, since a malicious actor typically injects additional messages, it is expected that an attack will likely be associated with a decrease in the period. Hence, in some embodiments, the deviation from the expected period for the subject message header of the most recent set of two (FIG. 2) or more (FIG. 3) messages that is flagged as an anomaly is only those deviations in which the period of the most recent set of messages is smaller than the expected period, as this suggests messages have been injected. By contrast, a deviation in which the period of the most recent set of messages is longer than the expected period is less likely to indicate a malicious attack, and is not flagged as an anomaly.

One potential issue with the temporal anomaly detection approaches of FIGS. 2 and 3 is that if the vehicle 10 changes its state then this can result in a change in the period of some periodic message headers. In a previous example, the ABS module transmits messages broadcasting wheel speed with ARB ID 0x354. These messages are transmitted less frequently when cruise control is not engaged, and more frequently when cruise control is engaged. In such a case, when the cruise control is engaged the frequency of messages with ARB ID 0x354 will abruptly increase, which may be erroneously detected as a temporal anomaly.

To address this problem, with reference back to FIG. 1 it is further disclosed herein to maintain the state machine 42 for the vehicle 10 based on messages on the CAN bus or other network 12 and/or sensor data received from one or more sensors 33 monitoring the platform 12, including maintaining an identification of the current state 54. In the wheel speed example, a state transition detected by the state machine 42 can induce a reset of the anomaly detector (and more particularly of the historical accumulation 50 and associated statistics 62). Hence, the abrupt increase in frequency for messages at ARB ID 0x354 will not be detected as an (erroneous) anomaly.

Figure 4:
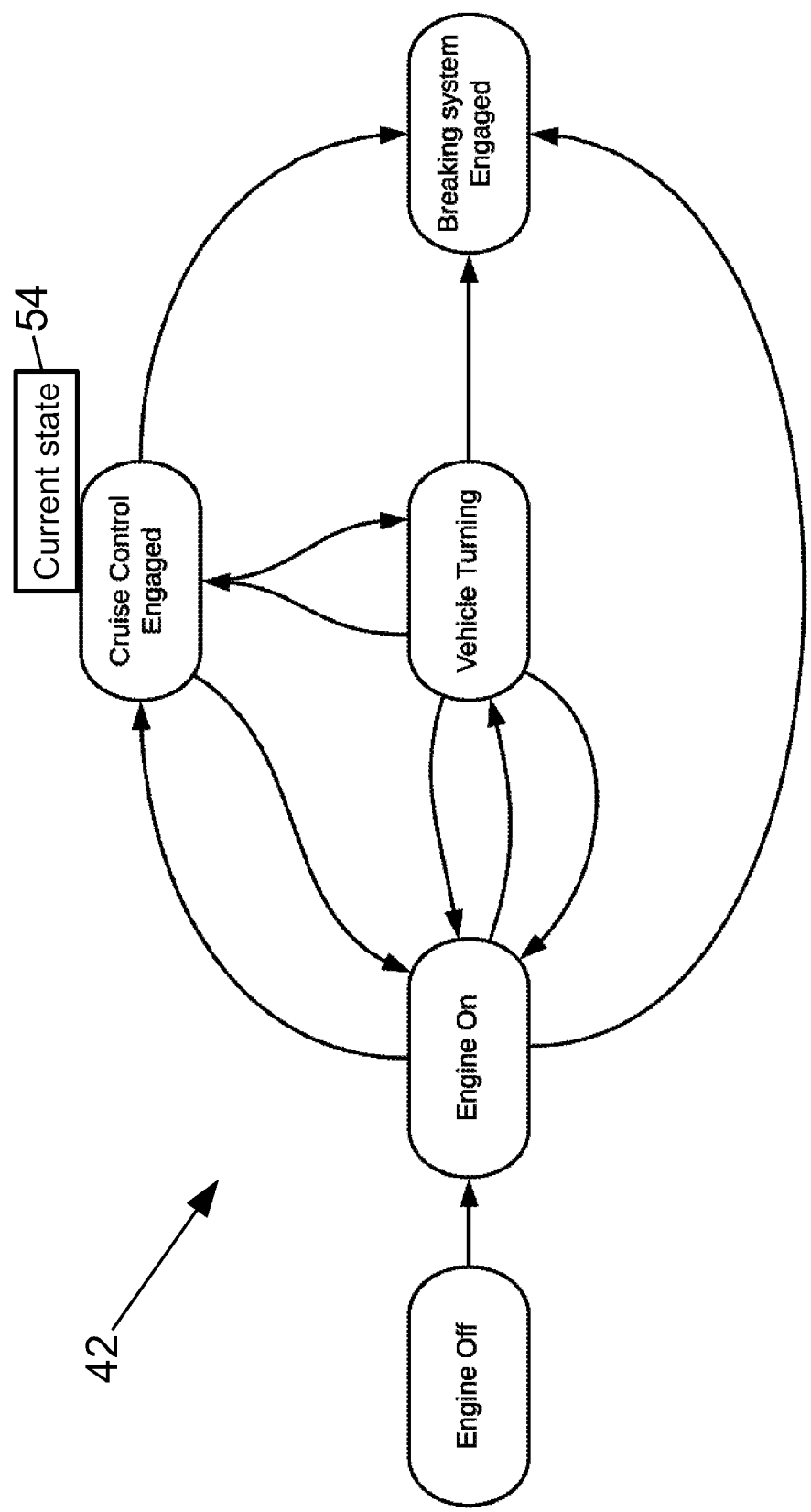
FIG. 4 presents a diagrammatic representation of one illustrative embodiment of a portion of the state machine of FIG. 1.

With brief reference to FIG. 4, an illustrative portion of a possible state machine for the vehicle 10 is shown, including the states: "Engine off"; "Engine on"; "Vehicle turning"; "Brake system engaged"; and "Cruise control engaged". The directed arrows in FIG. 4 represent permitted state transitions. The vehicle 10 is in only one state at any given time, e.g., in the state "Cruise control engaged" in FIG. 4. In accordance with a conventional state machine diagram representation, in FIG. 4 the possible states of the state machine are represented by nodes (shown as ovals in FIG. 4), and each allowed state transition from an initial state to a next state is shown as a directional arc running from the connecting the initial state to the next state. It is to be understood that the state machine will be specific to the particular platform. FIG. 4 shows a portion of a possible state machine for the illustrative vehicle 10. As another example (not shown), an industrial process might have states such as: "conveyor belt transport", "furnace ramp-up", "furnace dwell", "furnace rampdown", "quench", et cetera, with appropriate corresponding state transition arcs (e.g. "conveyor belt transport"→"furnace ramp-up", "furnace ramp-up"→"furnace dwell", "furnace dwell"→"furnace rampdown", "furnace ram pdown"→"conveyor belt transport", "conveyor belt transport"→"quench", et cetera.

The determination of the state of the vehicle 10 can be achieved using machine learning (ML) to remove any necessary a priori information a human observer might need for use a determination. ML algorithms can be used to learn different states for a vehicle, and the state-specific tuning parameters 52 used to adjust the tracking of periodic messages or even adjust the messages that are being tracked temporally. For example, a message broadcasting wheel speed might be sent periodically during normal operation. Once cruise control is engaged on the vehicle this periodicity might increase. The ML correlates the "Cruise control engaged" state with a faster periodicity for wheel speed broadcast messages without a human manually setting parameters. Another example could examine the physical state of the vehicle during a state transition. The power draw of a vehicle during engine startup is a well know pattern that a trained automotive engineer can easily detect. ML algorithms can extract physical characteristics from the data contained within CAN messages, removing the need for trained engineers to map out every known vehicle characteristic and identifying patterns humans cannot identify themselves.

A machine learning approach to determining state might entail the creation of a unique model to be used for anomaly detection per state tracked. The state machine 42 then monitors incoming messages and/or sensor data received from one or more sensors monitoring the platform for state change triggers. Once a trigger is observed, the state determination algorithm can then switch the model currently being used to detect anomalies. During training, a sliding window can be used to collect CAN messages for investigation. This sliding window will track the most recent X messages, where X is a tunable parameter. The machine learning algorithms can then determine a platform state by examining the unique messages, the number of occurrences/periodicity of messages or other characteristics yet to be determined contained within this sliding window.

The number of states tracked can also be adjusted to meet operational needs. For example a wide range state determination might only track two unique states such as vehicle in motion and vehicle idling. A more precise state determination can track N unique states where N is an adjustable parameter. These states might include vehicle parked, vehicle in cruise control, vehicle turning, vehicle accelerating/breaking, et cetera.

Each state may have a unique model associated with the state. When a state transition is detected, whether through a specific message(s) being detected or analyzing the buffer of recent messages, the model for the new state is switched in to refine the anomaly detection capabilities.

A state conscious anomaly detection algorithm can also be used to enhance the temporal anomaly detection. Periodic CAN messages are transmitted nearly deterministically (not fully deterministically because CAN itself cannot be guaranteed to be deterministic) on platform networks during normal operation. Periodic messages can be split into two categories, true periodic messages and event periodic messages. True periodic messages have a nearly deterministic rate when the engine is running. Event periodic messages have a nearly deterministic periodicity or a significantly different periodicity when an event occurs that places the platform in a unique state, such as enabling cruise control on a modern vehicle. When a platform enters this new state, there could be unique event periodic messages that are sent nearly deterministically for the duration of time the platform stays in this state. Using unique models for each state that this new algorithm tracks will enable the temporal algorithm to be adjusted, allowing the device to more effectively monitor for temporal anomalies.

Once state cognizance is obtained, the state can be used for other security assessments or condition assessments, enabling condition based maintenance or the detection of diagnostic at inappropriate times. Accordingly, it will be appreciated that certain messages may be appropriate on cyber-physical networks, i.e. the CAN network 12, only when the vehicle 10 is in the proper state. For example, a diagnostic reprogramming message to the engine controller (e.g., ECU 14) should only occur when the engine is off and the vehicle 10 is not moving, and thus in the 'ignition on, engine off' state. Similarly, there are messages that should only occur if the vehicle 10 is not in a specific state, but is permissible in any other state, for example a door unlock message would be appropriate in all states but 'engine on, vehicle moving'. Finally, a message could be appropriate in two or more states, and inappropriate in the remainder, for example, a diagnostic message for reprogramming the radio is acceptable in both the 'ignition on, engine off' and 'engine on, not moving' states, but not in the 'moving state' or 'ignition off' states. Whenever a message is observed, either by its presence or specificcontent that is in a disallowed state, then that message is anomalous and should be reported.

The detection of state incompatible anomalous messages may be performed by the ECU 14 in accordance with the following exemplary embodiment. Initially, messages are ingested from the network 12 and are either processed at the message level or segmented into signals. For the instant exemplary embodiment, the terms "message" and "signals" are used interchangeably. The ECU 14 or other suitable component then associates the signal with its corresponding data in a table/database, e.g. stored on the non-transitory storage medium 22. In various embodiments, the data may be stored in a DBC file, however it will be appreciated that the data may be in any representation wherein the signal is looked up in a table, and wherein further parameters about that signal are available. The parameters of that signal can, in a simple form, be an enumeration of available states, and binary value representing that signal is allowed (1) or disallowed (0) during that state.

An exemplary lookup table may contain parameter values (0,0; 1,1; 2,1; 3,1) for a signal that is disallowed in state (0), and allowed in states 1, 2, and 3, provided the corresponding system has states enumerated 0 through 3. In an enhanced embodiment, the table may be extended to give a cause for why the signal was anomalous and/or represent a corrective action to take. For example, (0,0,9;1,1,0;2,1,0;3,1,0) where 9 would represent an enumeration in a table that signifies either/or both corrective action to be taken, or a reason why the signal was anomalous. The table may also store the information for reason as text within the table.

In accordance with a more complex form, the table may be implemented to represent elements within a signal, i.e. the message, and their respective states. According to one implementation for matching of the signal content to allowed/disallowed states is via a bit field. It will be understood that this approach may be most applicable if signals are constrained to a small number of bits. For example, a set of fields (State; Set or Clear; Bit Field), where the State represents what state(s) the filed is active, Set or Clear represents whether the bit field represents bits that must be set (1) or clear (0) for triggering to occur, and Bit Field represents which bits to examine within the signal. If some bits must be positive and some be negative, two of these segments may be combined through an "and" combination. A non-limiting example is if an anomaly is to be reported in a state numerated as (3) and the third bit is Set (assuming an 8-bit number represented in binary notation, the table entry would be (3,1,'0000 0001'). A second implementation of representing the same information includes use of a typical database notation and Simple Query Language (SQL) methods, which are, as will be appreciated by those skilled in the art, suited to extracting and comparing features of data elements. The skilled artisan will appreciate that the such an implementation will necessarily increase the overhead of the system, e.g., resource usage, and the like. Accordingly, the vehicle 10 state may be used to determine whether the signal/message is anomalous via a blacklisting of messages based upon the vehicle state, e.g., if the vehicle 10 is moving, then any messages of a diagnostic nature could be prohibited. Thus, the parameter values associated for a current state may change in response to a transition from the current state to a new state. In the event that the signal (message) is determined to be anomalous based on the state, as indicated above, further processing as disclosed above and below may be applied.

Figure 5:
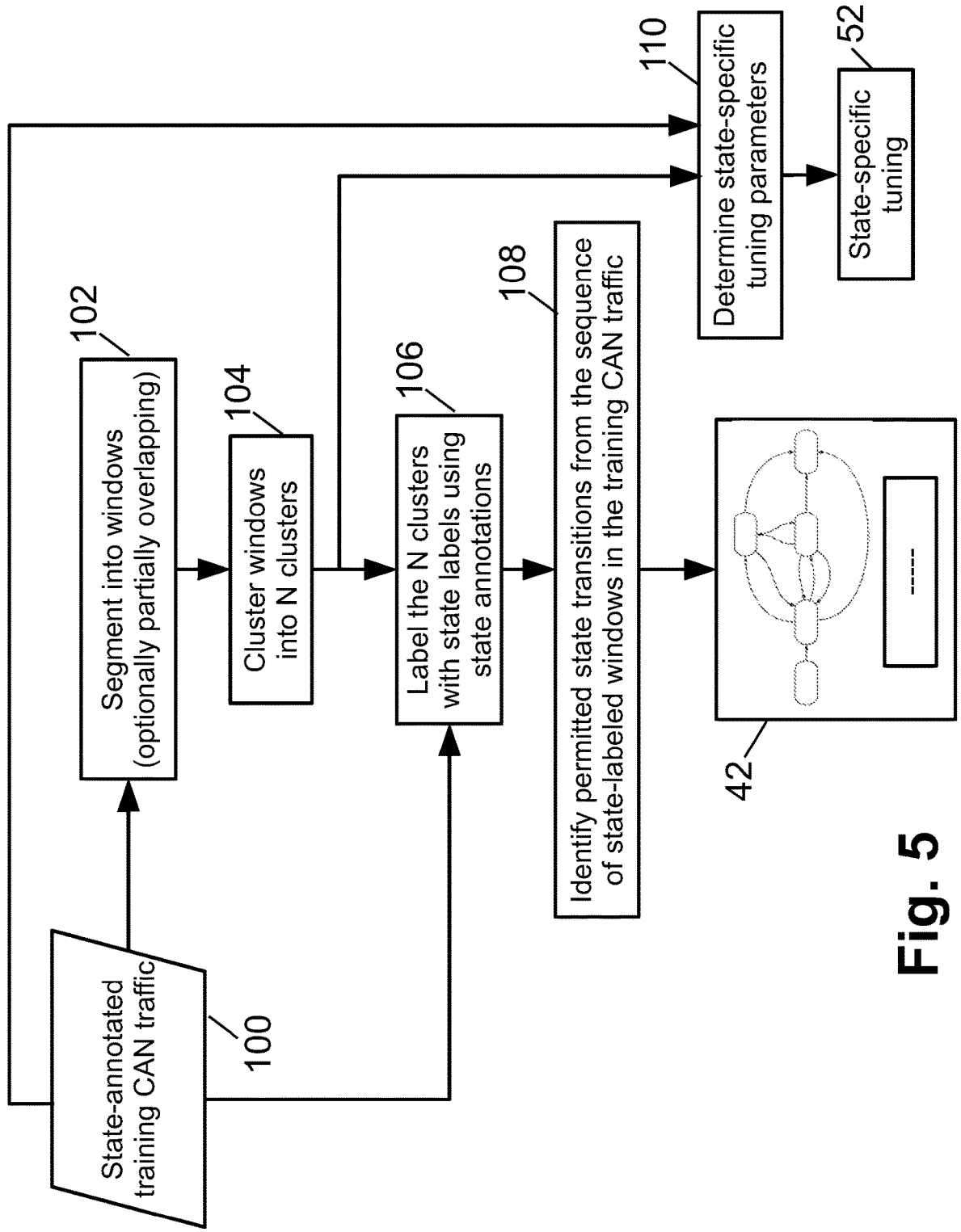
FIG. 5 presents a diagrammatic representation of a suitable method for automatically learning the state machine of FIG. 1 from training CAN bus data.

With reference now to FIG. 5, one illustrative approach for training the state machine 42 is described. The training utilizes training CAN traffic data 100 (and, optionally, training sensor data such as that acquired by the accelerometer 33 concurrently with the acquisition of the training CAN traffic data 100). For supervised or semi-supervised learning, the training CAN traffic data 100 is suitably labeled with state annotations, for example annotated by an engineer who performs the collection of the CAN data 100. In one example, the engineer operates the vehicle in different states (engine off, engine on/idle, driving, turning, cruise control engaged, cruise control disengaged, et cetera) and identifies the time at which each state change occurs (this may include reviewing the CAN data to identify messages precisely indicating when the engineer initiated various state-changing platform operations). Blocks of data between state change events are then labeled as to their correct state, e.g. if the engine is taken from idle to drive at time $t_m$ and then cruise control is engaged at a later time $t_n$ and disengaged at a still later time $t_p$ then the CAN data acquired over the time interval $[t_m, t_n]$ is labeled as platform state "drive", and the CAN data acquired over the time interval $[t_n, t_p]$ is labeled as platform state "cruise control engaged".

In an operation 102, the CAN data 100 are segmented into time intervals or windows. These may optionally be partially overlapping in time. In an operation 104 the windows are clustered into N clusters using a clustering technique such as k-means clustering. Each cluster corresponds to a state of the state machine. Depending on the choice of clustering algorithm, the number of clusters (N) may be fixed or may be a fitted parameter of the clustering operation 104. If the number of clusters is fixed, then the clustering can be re-run several times with different values for N to optimize the number of clusters by selecting the value of N that yields the most discriminative clusters (with the discriminativeness metric optionally incorporating a penalty for higher values of N so as to bias toward a state machine with a reasonable number of states). In an operation 106, the clusters are labeled with state labels based on the state annotations of the CAN data 100. For example, each cluster may be labeled with the state label with which most CAN data that falls in that cluster is labeled. In a variant embodiment, the state labeling operation 106 is omitted, in which case the states are not explicitly associated with a readily human-identifiable state.

In an operation 108, the permitted state transitions are identified. This can be done by labeling each window defined in the segmentation operation 102 with the state (and state label, if operation 106 is performed) to which it best fits. This produces a sequence of states, and hence a set of state transitions occurring in the training CAN data set 100. These are the allowed state transitions. By contrast, any state transition that does not occur in the training data 100 is not an allowed state. The identification of allowed state transitions, operation 108, is also optional. If the allowed state transitions (corresponding to the arcs in the example of FIG. 4) are not determined, then any state transition is considered to be allowable.

Furthermore, in an operation 110 the state-specific tuning 52 is determined for each state. For each state, the portions of the CAN bus training data 100 that belong to windows (from segmentation 102) assigned to that state form a (sub)set of training CAN bus data for use in optimizing the tuning parameters of the temporal anomaly detection 40 for that particular state.

The approach of FIG. 5 is merely one illustrative example of construction of the state machine 42. In other embodiments, the state machine 42 may be hand crafted. For example, the states can be defined based on known operational modalities of the vehicle 10, for example including (but not limited to) the states labeled in FIG. 4. State transitions can be identified by specific CAN bus messages. For example, design engineers may know that when cruise control is initially engaged a certain message, or set of messages, is conveyed on the CAN bus; and likewise when cruise is disengaged, when a turn is performed, and so forth. In this approach, the state-annotated CAN bus data 100 is used only to perform the state-specific tuning, e.g. the window segmentation 102 is suitably performed, each window assigned a state based on the state label annotations of the data 100, and the sub-sets of data assigned to the various states then used in the operation 110.

Figure 6:
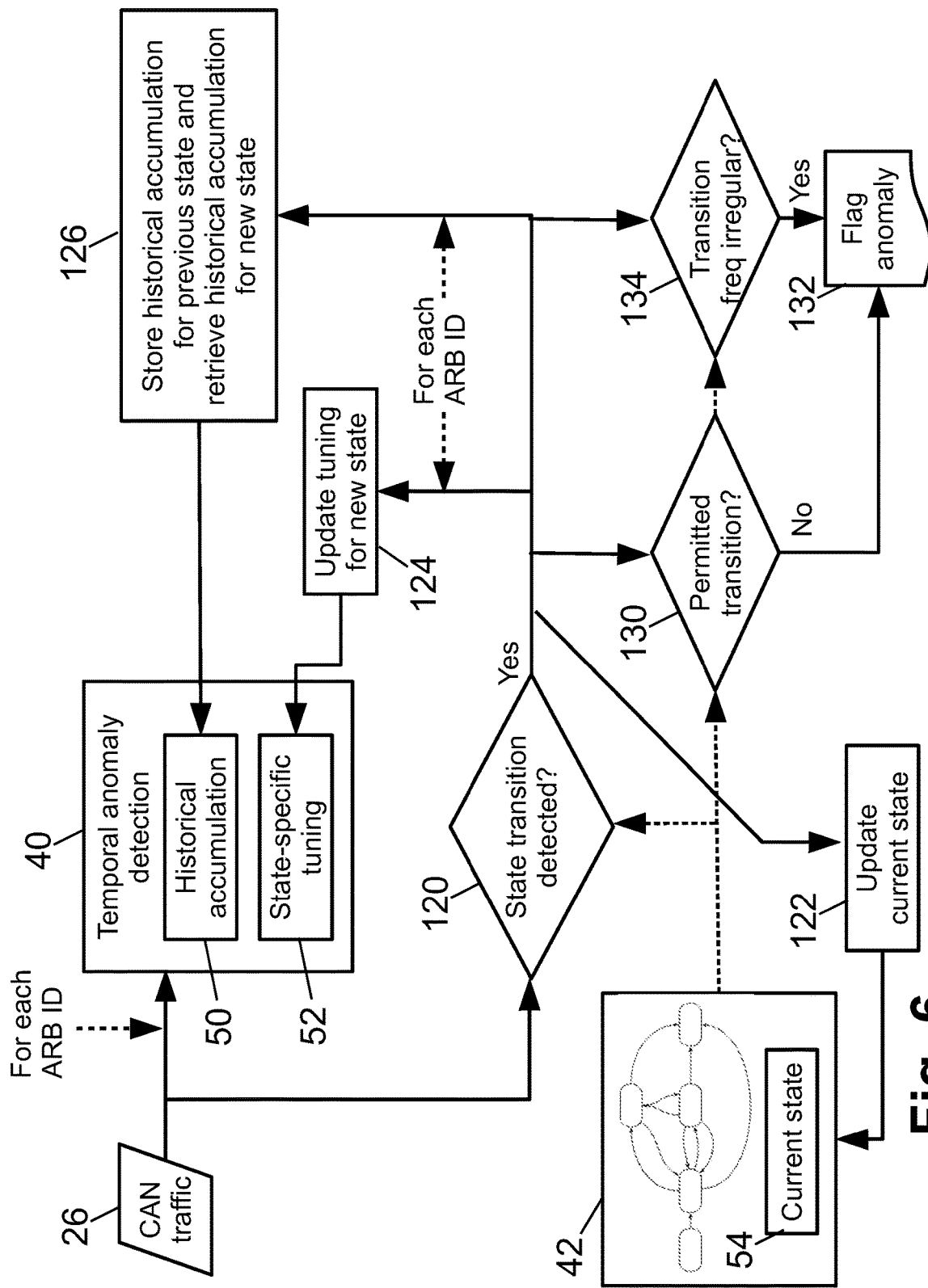
FIG. 6 presents a diagrammatic representation of an illustrative approach for utilizing the state machine to provide state awareness for the temporal anomaly detection of FIG. 2 or FIG. 3.

With reference now to FIG. 6, a suitable approach for implementation of state awareness in the temporal anomaly detection 40 is described. The state machine 42 is assumed to have been constructed, automatically or semi-automatically, and the state specific tuning parameters 52 derived for each state. During vehicle operation, the CAN bus traffic 26 is input to the temporal anomaly detection 40 and processed as described with reference to FIG. 2, or with reference to FIG. 3. Concurrently, the CAN bus traffic 26 (and, optionally, sensor data from available sensor(s) 33) is input to a state transition detection block 120 that detects state transitions, for example by detecting messages (or sets of messages) and/or sensor data indicating state transitions (see FIG. 7) or by fitting windows of CAN data to the clusters generated in operation 104 of FIG. 5 (see FIG. 8; this assumes the state machine 42 was created by a clustering algorithm). When state transition detection block 120 detects a state transition, the current state 54 of the state machine 42 is updated accordingly in an operation 122. Additionally, for each periodic message header, the state-specific tuning 52 of the temporal anomaly detection 40 is updated to values for the new state in an operation 124.

In some embodiments, the state transition also triggers a reset of the historical accumulation 50, since the existing data was for the previous state and may not be representative of the new state. However, this will result in some dead time as the historical accumulation for the new state is accrued.

Thus, in another approach, shown in FIG. 6, the state awareness is leveraged to avoid this dead time where possible. To this end, an operation 126 the historical accumulation for the previous state is stored, and the historical accumulation for the new state is retrieved if it exists. To further illustrate, consider the following example. The driver initially drives without cruise control, during which time historical accumulation 50 is accrued for the "cruise control disengaged" state. The driver then engages cruise control (a state transition). In response, the operation 126 stores the historical accumulation for the "cruise control disengaged" state and, assuming no historical accumulation is yet available for the "cruise control engaged" state, resets the historical accumulation 50 for the new "cruise control engaged" state. There will now be some dead time as sufficient historical accumulation accrues for the new state before temporal anomaly detection can commence. Thereafter, the driver drives on cruise for some time, during which historical accumulation 50 for the "cruise control engaged" state continues to be accrued. The driver then enters more congested traffic and disengages cruise control (another state transition). In response, the operation 126 stores the historical accumulation for the "cruise control engaged" state and retrieves the previously stored historical accumulation for the "cruise control disengaged" state. Accordingly, there is no dead time before temporal anomaly detection can operate for the "cruise control disengaged" state. If the driver then enters less traffic and reengages cruise control, the operation 126 stores the historical accumulation for the "cruise control disengaged" state and retrieves the previously stored historical accumulation for the "cruise control engaged" state, again allowing the temporal anomaly detection to proceed without dead time. And so forth.

In FIG. 6, the detected state transition is used to update the state-specific tuning 52 of the illustrative temporal anomaly detection 40. However, it will be appreciated that other types of anomaly detection can be similarly updated with state-specific tuning. For example, per-message SVM classifier-based anomaly detection such as that described in Harris et al., U.S. Pat. No. 9,792,435 can have the hyperparameter γ updated with state-specific values.

If the state machine 42 includes information on permitted state transitions (e.g. as determined in the operation 108 of the training process of FIG. 5, or as hand crafted by design engineers based on known operation of the vehicle 10) then this information can also provide an independent mechanism for anomaly detection. For example, at decision 130 it is determined whether the state transition is a permitted transition, and if not then at 132 an anomalous state transition is flagged. Similarly, in a decision 134 it is determined whether a frequency or other pattern of state transitions is irregular (e.g., based on patterns of state transitions observed in operation 108 of FIG. 5) and an anomalous pattern of state transitions may be similarly flagged.

Figure 7:
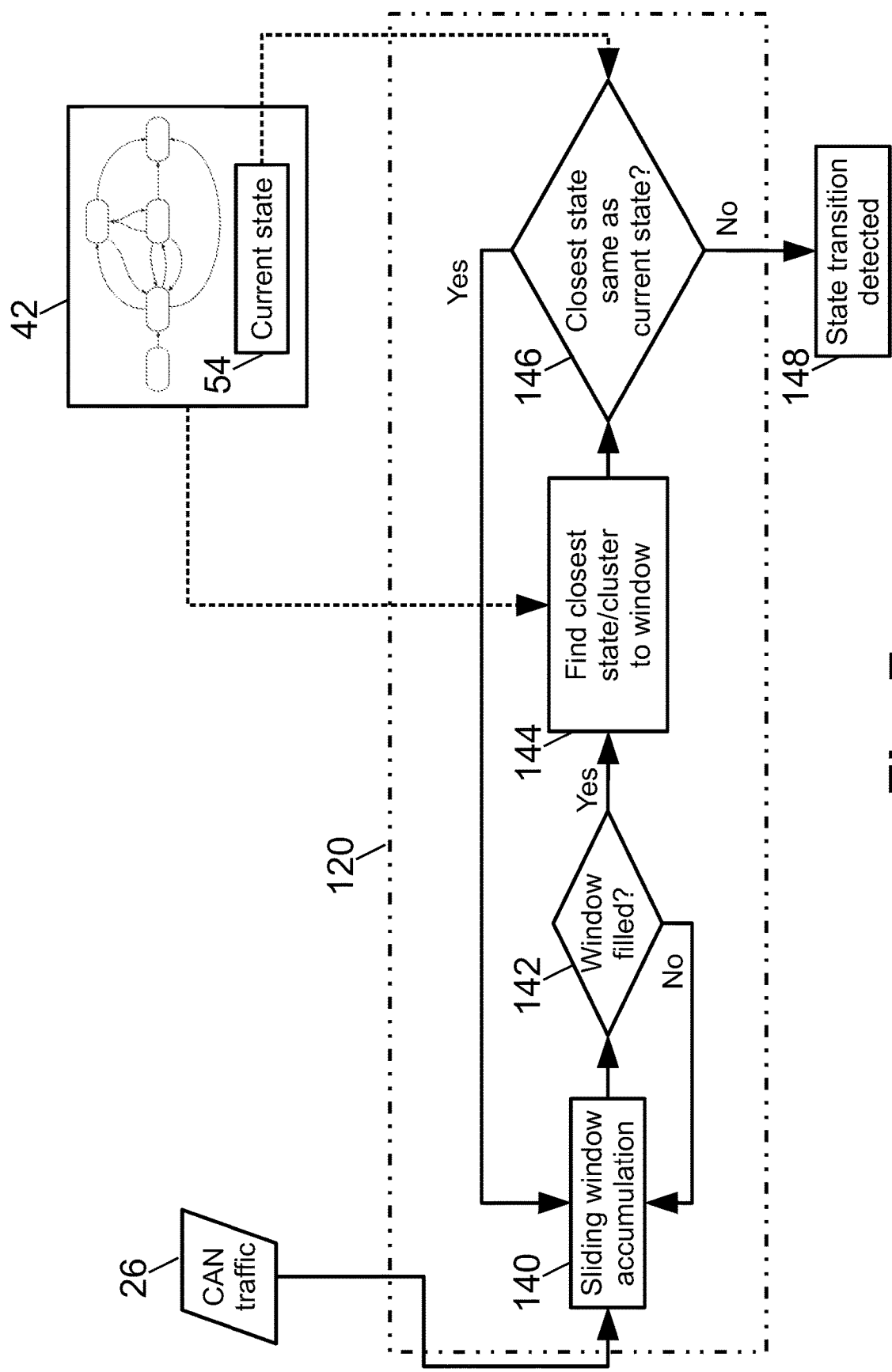

With reference now to FIGS. 7 and 8, two illustrative embodiments of the state transition detection block 120 of FIG. 6 are described. FIG. 7 shows an embodiment that is suitably employed for cases in which the state machine 42 is generated by CAN bus data window clustering as described with reference to FIG. 5. A sliding window 140 accrues messages from the CAN bus traffic 26 until at a decision block 142 it is determined that the window is filled. To facilitate comparison with the clusters generated by operations 102, 104 of the state machine learning of FIG. 5, the decision block 142 preferably indicates the window is filled when it has the same number of messages as do the windows produced by the segmentation operation 102. When the window is filled, it is compared with the clusters/states generated by the operations 102, 104 of the state machine learning of FIG. 5 in order to identify the closest cluster/state to the messages window. At a decision 146, it is determined whether this closest cluster/state is the same as the current state 54. If the closest cluster/state is the same as the current state 54 then no state transition has occurred. On the other hand, if the closest cluster/state is different from the current state 54 then a state transition has been detected 148, namely the state transition from the current state 54 to the new state which is the closest cluster/state to the messages window. Optionally, the decision 146 may employ some statistics to improve robustness, for example the detection 148 may only be made if the same closest cluster/state continues to be detected as the sliding window 140 accrues some number M messages.

With reference to FIG. 8, an embodiment of the state transition detection block 120 is described which is suitably used in embodiments in which the state machine 42 includes identification of specific messages or sets of messages that indicate state transitions. For example, if the state machine 42 is hand crafted then the designer may label each state transition with a message or set of messages that occur as part of that state transition. In this embodiment a buffer 150 stores the last N messages received from the CAN bus traffic 26. The buffer size N should be large enough to encompass the maximum expected time interval over which any set of messages indicative of a state transition is expected to occur. A block 152 cycles through each possible state transition from the current state, and a decision block 152 monitors the CAN bus traffic 26 to detect whether a message or set of messages indicating each such state transition has occurred—if so, and then a state transition is detected 156. The processing 152, 154 is repeated for all possible state transitions each time a new message comes into the buffer 150. (In alternative approaches, the buffer processing 152, 154 may be repeated less frequently, so long as the buffer size N is large enough to prevent the possibility of missing a set of messages indicative of a state transition).

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

To aid the Patent Office and any readers of this application and any resulting patent in interpreting the claims appended hereto, applicants do not intend any of the appended claims or claim elements to invoke 35 U.S.C. § 112(f) unless the words "means for" or "step for" are explicitly used in the particular claim.

We claim:

1. An electronic device connectable with a network of a platform in which traffic on the network is received by all electronic devices on the network and the network does not provide message authentication and wherein the transmitted messages comprise payloads and message headers identifying the payloads, the electronic device programmed to:

train a state machine for the platform utilizing training traffic data from the network, the training comprising:
segmenting the training traffic data into a plurality of windows, wherein the training traffic data comprises state-annotated traffic,
clustering the plurality of windows into N clusters thereof, wherein each cluster corresponds to a state of the state machine,
labeling each of the N clusters with a state label representative of the segment of training traffic data contained in the corresponding window, and
identifying permitted state transitions in accordance with each state label;
maintain the trained state machine for the platform based on messages on the network and/or sensor data received from one or more sensors monitoring the platform;
in response to a transition of the state machine to a new state, tune parameters of at least one of:
(i) a parameter of the identification of periodic message headers based on the period variability metric to a parameter value for the new state and/or
(ii) a parameter defining the deviation that is detected as a temporal anomaly to a parameter value for the new state;
compute expected periods and period variability metrics for historical accumulations of messages for different message headers and identify periodic message headers based on the period variability metrics;
detect a temporal anomaly as a deviation of a period of a most recent set of two or more messages with a periodic message header from the expected period for the periodic message header; and
generate an alert indicating the detected temporal anomaly.

2. The electronic device of claim 1, wherein the most recent set of two or more messages with the periodic message header consists of a most recent two messages with the periodic message header, and the temporal anomaly is detected as a deviation of the time separation of the most recent two messages from the expected period for the periodic message header.

3. The electronic device of claim 2, wherein the alert includes a representation of the most recent message with the periodic message header.

4. The electronic device of claim 1, wherein the most recent set of two or more messages with the periodic message header consists of a set of three or more most recent messages with the periodic message header, and the temporal anomaly is detected as a deviation of a measured period for the set of three or more most recent messages from the expected period for the periodic message header.

5. The electronic device of claim 1, wherein the electronic device is further programmed to:
control a task performed by the electronic device based on messages received via the network; and
upon detection of the temporal anomaly, reject one or more messages of the most recent set of two or more messages for use in controlling the task.

6. The electronic device of claim 1, wherein the electronic device is further programmed,
in response to a transition of the state machine from a current state to a new state to:
store the historical accumulations of messages for the different message headers for the current state; and
load from a memory historical accumulations of messages for the different message headers for the new state.

7. The electronic device of claim 1, wherein the network comprises a Controller Area Network (CAN) bus and the message headers comprise ARB ID headers.

8. An electronic device connectable with a network of a platform in which traffic on the network is received by all electronic devices on the network and the network does not provide message authentication and wherein the transmitted messages comprise payloads and message headers identifying the payloads, the electronic device including:
an electronic processor; and
a non-transitory storage medium storing temporal anomaly detection instructions which are readable and executable by the electronic processor to perform a temporal anomaly detection method, the temporal anomaly detection instructions including:
state machine instructions readable and executable by the electronic processor to train a state machine for the platform utilizing training traffic data from the network, wherein the training comprises:
segmenting the training traffic data into a plurality of windows, wherein the training traffic data comprises state-annotated traffic,
clustering the plurality of windows into N clusters thereof, wherein each cluster corresponds to a state of the state machine,
labeling each of the N clusters with a state label representative of the segment of training traffic data contained in the corresponding window, and
identifying permitted state transitions in accordance with each state label;
state machine instructions readable and executable by the electronic processor to maintain the state machine for the platform based on messages on the network and/or sensor data received from one or more sensors monitoring the platform;
instructions readable and executable by the electronic processor to compute expected periods and period variability metrics for historical accumulations of messages for different message headers, and identify periodic message headers based on the period variability metrics;
instructions readable and executable by the electronic processor to detect a temporal anomaly as a deviation of a period of a most recent set of two or more messages with a periodic message header from the expected period for the periodic message header; and
instructions readable and executable by the electronic processor to generate an alert indicating the detected temporal anomaly
wherein the temporal anomaly detection instructions further include instructions readable and executable by the electronic processor to, in response to a transition of the state machine to a new state, update at least one parameter of the temporal anomaly detection method to a parameter value of the new state.

9. The electronic device of claim 8, wherein the most recent set of two or more messages with the periodic message header consists of a most recent two messages with the periodic message header, and the temporal anomaly is detected as a deviation of the time separation of the most recent two messages from the expected period for the periodic message header.

10. The electronic device of claim 9, wherein the alert includes a representation of the most recent message with the periodic message header.

11. The electronic device of claim 8, wherein the most recent set of two or more messages with the periodic message header consists of a set of three or more most recent messages with the periodic message header, and the temporal anomaly is detected as a deviation of a measured period for the set of three or more most recent messages from the expected period for the periodic message header.

12. The electronic device of claim 8, wherein the non-transitory storage medium further stores:
control instructions readable and executable by the electronic processor to control the electronic device based on messages received via the network; and
message rejection instructions readable and executable by the electronic processor to prevent the control instructions from processing one or more messages of the most recent set of two or more messages.

13. The electronic device of claim 8, wherein the temporal anomaly detection instructions further include instructions readable and executable by the electronic processor to, in response to a transition of the state machine from a current state to a new state:
store the historical accumulations of messages for the different message headers for the current state; and
load from a memory historical accumulations of messages for the different message headers for the new state.

14. The electronic device of claim 8, wherein the network comprises a Controller Area Network (CAN) bus and the message headers comprise ARB ID headers.

15. An electronic device connectable with a network servicing a platform in which traffic on the network is received by all electronic devices on the network and the network does not provide message authentication, the electronic device programmed to:
train a state machine for the platform utilizing training traffic data from the network, comprising:
segmenting the training traffic data into a plurality of windows, wherein the training traffic data comprises state-annotated traffic,
clustering the plurality of windows into N clusters thereof, wherein each cluster corresponds to a state of the state machine,
labeling each of the N clusters with a state label representative of the segment of training traffic data contained in the corresponding window, and
identifying permitted state transitions in accordance with each state label;
maintain the state machine for the platform based on messages on the network and/or sensor data received from one or more sensors monitoring the platform;

perform anomaly detection on messages on the network using at least one parameter value for a current state of the state machine including generating an alert in response to detecting an anomaly; and in response to a transition of the state machine from the current state to a new state, updating the at least one parameter value for the new state.

16. The electronic device as set forth in claim 15, wherein the electronic device is further programmed to:

detect a transition of the state machine from a current state to a new state; and generate an alert in response to the detected transition not being a permitted transition of the state machine.

17. The electronic device as set forth in claim 15, wherein the electronic device is further programmed to:

detect state transitions of the state machine; and generate an alert in response to a pattern of the detected state transitions satisfying an irregular transitions pattern criterion.

18. The electronic device as set forth in claim 15, wherein:

the messages transmitted on the network comprise payloads and message headers identifying the payloads;

the performing of anomaly detection includes detecting periodic message headers for which messages on the network satisfy have an expected periodicity that satisfies a periodicity criterion and detecting an anomaly as a deviation of periodicity of recent messages with the periodic message header from the expected periodicity; and wherein the network comprises a Controller Area Network (CAN) bus.

* * * * *